United States Patent
Lim et al.

(10) Patent No.: US 10,045,548 B2
(45) Date of Patent: Aug. 14, 2018

(54) METHOD OF PRODUCING WHOLE SOYBEAN MILK HAVING IMPROVED STORAGE STABILITY

(71) Applicant: Hanmi Medicare, Inc., Songpa-gu, Seoul (KR)

(72) Inventors: Jonghoon Lim, Seoul (KR); Byeong Ku Choi, Hwaseong-si (KR)

(73) Assignee: HANMI MEDICARE, INC., Seoul (KR)

(*) Notice: Subject to any disclaimer, the term of this patent is extended or adjusted under 35 U.S.C. 154(b) by 159 days.

(21) Appl. No.: 14/426,859

(22) PCT Filed: Sep. 11, 2013

(86) PCT No.: PCT/KR2013/008227
§ 371 (c)(1),
(2) Date: Mar. 9, 2015

(87) PCT Pub. No.: WO2014/046416
PCT Pub. Date: Mar. 27, 2014

(65) Prior Publication Data
US 2015/0237879 A1    Aug. 27, 2015

(30) Foreign Application Priority Data

Sep. 19, 2012  (KR) .................. 10-2012-0104177

(51) Int. Cl.
*A23C 11/10* (2006.01)
*A23L 3/16* (2006.01)
(Continued)

(52) U.S. Cl.
CPC ........ *A23C 11/103* (2013.01); *A23C 2210/15* (2013.01); *A23L 2/42* (2013.01);
(Continued)

(58) Field of Classification Search
CPC ..... A23C 11/10; A23C 11/103; A23C 11/106; A23C 2210/15; A23L 5/10; A23L 5/13;
(Continued)

(56) References Cited

U.S. PATENT DOCUMENTS 3,314,798 A * 4/1967 Graves .................. A23C 15/16
                                                              426/586
3,901,978 A * 8/1975 Nelson .................. A23C 11/06
                                                              426/508
(Continued)

FOREIGN PATENT DOCUMENTS

CN    101155519 A    4/2008
CN    101473916 A    7/2009
(Continued)

OTHER PUBLICATIONS

Roasting Soy NPL, published Sep. 7, 2010, http://web.archive.org/web/20100907231515/http://www.food.com/recipe/roasted-soy-nuts-280911.*

(Continued)

*Primary Examiner* — Drew E Becker
*Assistant Examiner* — Bryan Kim
(74) *Attorney, Agent, or Firm* — Saliwanchik, Lloyd & Eisenschenk

(57) ABSTRACT

The present invention relates to a method for preparing a whole soybean milk with superior storage stability which shows almost no change in viscosity when stored for a long time, and a whole soybean milk prepared thereby. As a method of the present invention provides a whole soybean milk having small particle sizes based on a procedure simpler than pre-existing methods, time for preparing a whole soybean milk can be shortened. Further, as the whole soybean milk obtained by this method shows almost no change in viscosity when stored for a long time, its shelf life (Continued)

can be extended dramatically as compared to pre-existing whole soybean milk containing both soybean milk residue and soybean liquid, which shows viscosity increase over time.

4 Claims, 10 Drawing Sheets

(51) Int. Cl.
    *A23L 19/00*     (2016.01)
    *A23L 3/015*     (2006.01)
    *A23L 5/10*     (2016.01)
    *A23L 2/42*     (2006.01)
    *A23L 3/18*     (2006.01)

(52) U.S. Cl.
    CPC .............. *A23L 3/015* (2013.01); *A23L 3/16* (2013.01); *A23L 3/18* (2013.01); *A23L 5/15* (2016.08); *A23L 19/09* (2016.08); *A23V 2002/00* (2013.01); *A23V 2200/00* (2013.01)

(58) Field of Classification Search
    CPC ..... A23L 5/15; A23L 5/17; A23L 5/20; A23L 5/21; A23L 11/00; A23L 11/05; A23L 11/07; A23L 11/30; A23L 11/31; A23L 3/015; A23J 1/14; A23J 3/16; A01J 11/16
    See application file for complete search history.

(56) References Cited

U.S. PATENT DOCUMENTS

| | | | | |
|---|---|---|---|---|
| 3,981,234 A * | 9/1976 | Nelson | ............... | A23C 11/103 426/507 |
| 4,094,633 A * | 6/1978 | Peterson | ............... | A23N 12/10 426/469 |
| 4,119,733 A * | 10/1978 | Hsieh | ............... | A23C 11/103 426/46 |
| 4,902,526 A * | 2/1990 | Sudo | ............... | A23C 11/103 426/598 |
| 5,520,932 A * | 5/1996 | McCurdy | ............... | A61K 9/14 264/140 |
| 5,955,134 A * | 9/1999 | Nishimura | ............... | A23L 11/07 426/489 |
| 6,150,399 A * | 11/2000 | Patel | ............... | A23L 33/00 424/440 |
| 6,316,043 B1 * | 11/2001 | Tsumura | ............... | A23C 11/103 426/634 |
| 2002/0127325 A1 * | 9/2002 | Gandhi | ............... | A23C 11/103 426/634 |
| 2003/0104108 A1 * | 6/2003 | Patel | ............... | A23L 2/02 426/598 |
| 2007/0031576 A1 * | 2/2007 | Cho | ............... | A23C 11/103 426/634 |
| 2007/0212472 A1 * | 9/2007 | Holenstein | ............... | A23C 11/103 426/634 |
| 2009/0123618 A1 * | 5/2009 | Gandhi | ............... | A23C 11/103 426/330.3 |
| 2010/0047389 A1 * | 2/2010 | Yura | ............... | A23L 2/52 426/33 |
| 2010/0316779 A1 | 12/2010 | Oh | | |
| 2012/0107483 A1 * | 5/2012 | Park | ............... | A23C 20/025 426/634 |
| 2014/0113013 A1 * | 4/2014 | Samoto | ............... | A61K 36/00 424/757 |

FOREIGN PATENT DOCUMENTS

| | | | | |
|---|---|---|---|---|
| EP | 2471374 A1 | 7/2012 | | |
| GB | 402948 A * | 12/1933 | ........... | A23C 11/103 |
| JP | S 53-115856 | 10/1978 | | |
| JP | S 60-78552 | 5/1985 | | |
| JP | H 10-295308 | 11/1988 | | |
| JP | 2000-201640 | 7/2000 | | |
| JP | 2010004809 A | 1/2010 | | |
| KR | 10-0182829 | 3/1999 | | |
| KR | 10-2001-0084493 | 9/2001 | | |
| KR | 10-2002-0090655 | 12/2002 | | |
| KR | 10-2008-0097963 | 11/2008 | | |
| KR | 10-2008-0102729 | 11/2008 | | |
| KR | 10-2010-0114725 | 10/2010 | | |
| KR | 10-1065908 | 9/2011 | | |
| WO | WO-2006109991 A1 * | 10/2006 | ........... | A23C 11/103 |

OTHER PUBLICATIONS

Bruzzano, Carole. "How to Make Soy Milk Powder," *eHow*, accessed http://www.ehow.com/how_8462889_make-soy-milk-powder.html, published from Nov. 13, 2011.

Office Action dated Apr. 1, 2016, for corresponding Australian Patent Application No. 2013318841.

Office Action dated Nov. 1, 2016, for corresponding Australian Patent Application No. 2013318841.

* cited by examiner

FIG. 1

| |
|---|
| Soybean |
| Careful selection, roasting, dehulling |
| (Drum roaster) |
| Cooking |
| (98°C/4min) |
| Coarse grinding |
| (Crusher, 1.5⌀) |
| Fine grinding |
| $1^{st}$ : #212 |
| $2^{nd}$ : #220 (or #222) |
| Whole soybean liquid |
| Mixing |
| First micro homogenization |
| (300 Bar) |
| Pasteurization, cooling, sterilization |
| (PHE, 98°C/30sec) |
| Storage tank |
| Sterilization |
| (150°C/5sec) |
| Second micro homogenization |
| (150-300 Bar) |
| Aseptic Storage Tank |
| Filing |
| (Aseptic filler) |
| Packaging |

METHOD OF PRODUCING WHOLE SOYBEAN MILK HAVING IMPROVED STORAGE STABILITY

CROSS REFERENCE TO A RELATED APPLICATION

This application is a National Stage Application of International Application Number PCT/KR2013/008227, filed Sep. 11, 2013; which claims priority to Korean Patent Application No. 10-2012-0104177, filed Sep. 19, 2012; all of which are incorporated herein by reference in their entirety.

FIELD OF THE INVENTION

The present invention relates to a method for preparing a whole soybean milk with superior storage stability which shows almost no change in viscosity when stored for a long time.

BACKGROUND OF THE INVENTION

A conventional method for preparing soybean milk includes cooking and grinding boiled soybeans, water-soaked raw soybeans or soybean powders, and then pressing the ground material. Since about one-third by weight of soybean feed is discarded as a solid residue or soybean milk residue in the conventional methods for preparing soybean milk and tofu. As a result, a large amount of nutritious and functional components of soybeans such as fibrous materials, lipids, amino acids and inorganic materials, etc. are lost from soybean foods as soybean milk residue.

Methods to overcome the problem of losing nutritious components, and prepare soybean milk containing the entire nutrients of soybeans (referred to as "whole soybean milk") have been suggested, e.g., decomposing and treating the soybean milk residue with an enzyme (Korean Patent Laid-Open Publication No. 2001-41120); using a combination of ultrasonic and steam treatments (Korean Patent Nos. 41494 and 59907); and reducing the production of soybean milk residue with a high temperature/high pressure treatment (Korean Patent No. 86038), etc. However, most of the above methods are not suitable for commercialization because they tend to yield soybean milk containing large particles resulting in coarse texture or precipitation of the particles, which has a disagreeable taste or scent resulting from retreatment of the soybean milk residue. Particularly, the methods employing an enzymatic decomposition technique have not overcome a disadvantage of being non-economical because of the use of an expensive enzyme.

Further, methods such as one for preparing whole soybean milk using processed and treated raw soybean powders (Korean Patent No. 182829) have been reported, but they could not avoid the problem of losing some part of nutritious components in a pre-treatment process for processing soybeans to powders, and thus are not suitable for utilizing the entire nutrients of soybeans.

On the other hand, Korean Patent No. 822,165 discloses a method for preparing a whole soybean milk and tofu comprising the following steps. After soaking whole soybeans or dehulled soybeans in room temperature water for about 8-15 hours and subjecting them to the first grinding using a grinder (Crusher), a refining process to remove outer skin of soybeans or impurities in the ground liquid is carried out 1 to 3 times by a refiner. Then, the resulting liquid is subjected the second grinding using a fine grinder (Ultramizer), and the resulting ground liquid is maintained at 85 to 90° C. for 1 to 2 minutes to inactivate enzymes in the liquid. Next, it is micronized through ultra-high pressure homogenization process, to prepare a whole soybean milk. Alternatively, soybean liquid and soybean milk residue may be separated by a fluid separator, and the separated soybean milk residue may be mixed with purified water and recycled in a circulating grinding device for approximately 30 to 50 minutes at 50 to 60° C. to soften the liquid from the soybean milk residue. Then, a mixed solution of the soybean liquid separated by the liquid separator and the softened liquid from soybean milk residue circulated by the circulating grinding device is micronized through an ultra-high pressure homogenizing process, to prepare a whole soybean milk.

However, the above methods have a disadvantage that the soybean milk product shows viscosity increase and thickening phenomenon over time, which results in an unfavorable texture on tasting, and makes it impossible to have a long shelf life.

Accordingly, the present inventors have endeavored to develop an economical and efficient method for preparing a whole soybean milk which has small particle diameters and excellent long-term storage stability. It was discovered that a whole soybean milk having small particle diameters and showing almost no change in viscosity when stored for a long time can be prepared, by conducting cooking process of soybeans after roasting them, and micronizing particles in a cutting manner instead of a conventional mill stone method.

SUMMARY OF THE INVENTION

It is an object of the present invention to provide an economical and efficient method for preparing a whole soybean milk which has small particle diameters and shows no change in viscosity when stored for a long time.

It is a further object of the present invention to provide a whole soybean milk prepared by the above method.

To achieve the above first object, the present invention provides a method for preparing a whole soybean milk, comprising the steps of:
1) roasting and dehulling soybeans to obtain dehulled soybeans;
2) cooking dehulled soybeans to obtain cooked soybeans;
3) coarsely grinding the cooked soybeans to obtain a coarsely ground soybean liquid;
4) finely grinding particles of the coarsely ground soybean liquid in a cutting manner by using a mechanical grinding device to obtain a whole soybean liquid; and
5) homogenizing the whole soybean liquid to obtain the micro size of particles.

To achieve the above second object, the present invention provides a whole soybean milk prepared by the above method.

As a method of the present invention provides a whole soybean milk having small particle sizes based on a procedure simpler than pre-existing methods, time for preparing a whole soybean milk can be shortened. Further, as the whole soybean milk obtained by this method shows almost no change in viscosity when stored for a long time, its shelf life can be extended dramatically as compared to pre-existing whole soybean milk containing both soybean milk residue and soybean liquid, which shows viscosity increase over time.

BRIEF DESCRIPTION OF DRAWINGS

FIG. 1 is a schematic view showing an example of a preparation process of the present invention.

DETAILED DESCRIPTION OF THE INVENTION

Figure 2:
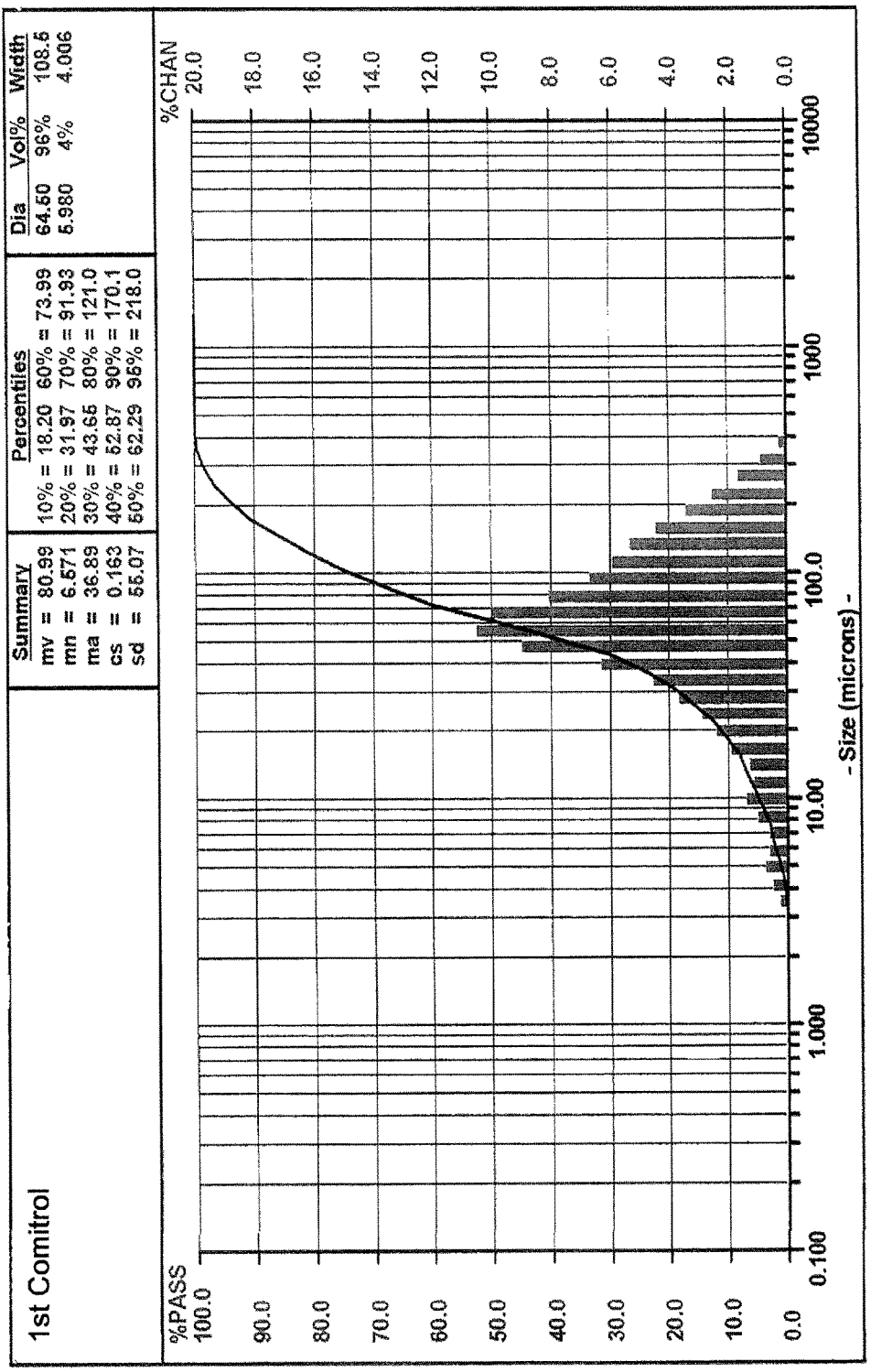
FIGS. 2 and 3 show results of the particle diameter analysis of the soybean liquid after first and second micronization steps of the fine grinding process of the present invention, respectively.

The present invention provides a method for preparing a whole soybean milk, comprising the steps of: 1) roasting and dehulling soybeans to obtain dehulled soybeans; 2) cooking the dehulled soybeans to obtain cooked soybeans; 3) coarsely grinding the cooked soybeans to obtain a coarsely ground soybean liquid; 4) finely grinding particles of the coarsely ground soybean liquid in a cutting manner by using a grinding device to obtain a whole soybean liquid; and 5) micro homogenizing the whole soybean liquid.

The term "whole soybean milk" in the present invention refers to a soybean milk prepared to contain entire nutrients of soybeans without removing the useful components which were discarded as soybean milk residue in pre-existing methods for preparing a soybean milk from whole soybeans or dehulled soybeans.

The present invention allows preparation of a whole soybean milk which has small particle diameters and shows almost no change in viscosity even when stored for a long time, by the following process: cooking dehulled soybeans which went through a roasting step for an appropriate time and at a proper temperature, then finely grinding them using a mechanical grinding device which finely grinds particles in a cutting manner, such as Comitrol, and micro homogenizing them by applying homogeneous pressure. Specifically, a process of the present invention may be carried out through the following steps described below.

1) Careful Selection of Soybeans

Foreign materials (e.g., iron pieces, stones, wood, or grains, etc.) are removed from whole soybeans using a stone picker or careful selector.

2) Roasting Step

In the present invention, soybeans are roasted to add savory taste to a whole soybean milk, inactivate an agent which causes beany flavour characteristic of beans beforehand, and improve the particle diameters of the whole soybean liquid to be finally prepared.

The roasting step may be carried out in any one of the fashions commonly known in the art, such as hot air fashion, semi-hot air fashion, flame fashion, or far-infrared fashion, etc. A roaster used in the roasting step may be appropriately selected in accordance with the above fashions. For example, a drum roaster can be used in case of a flame fashion.

In a roasting step according to the flame fashion of the present invention, the inside temperature of the drum roaster, rotational speed of the drum and roasting time can influence the extent of roasting of soybeans and the particle diameters, viscosity, and sensory property of finally prepared soybean liquid. In order to obtain a whole soybean milk with a favorable taste, it is recommended that the inside temperature of the drum roaster range from 150 to 240° C., the rotational speed of the drum range from 20 to 40 rpm, the roasting time range from 4 to 12 minutes, and input and output amounts of the soybeans range from 40 to 50 kg per minute.

As an example of the present invention, in case of a drum roaster, tastes can be diversified by adjusting the roasting time while the inside temperature and rotational speed of the drum are fixed. For example, if the inside temperature of the drum just before the soybean input, and the rotational speed of the drum are fixed at about 220° C. and at about 27 rpm, respectively, fresh taste can be obtained by roasting the soybeans for a short time of 4 to 8 minutes, while nutty taste be obtained by roasting them for a long time of 9 to 12 minutes.

According to one embodiment of the present invention, the roasting step can be carried out by roasting the carefully selected whole soybeans for 4 to 12 minutes in a drum roaster in which its temperature and rotational speed are fixed at 220° C. and at 27 rpm, respectively.

In addition, a roasting step according to the hot air fashion of the present invention is preferably carried out with the roasting temperature of 150 to 200° C., the soybean input speed of 30 to 70%, the soybean output rate of 60 to 95%, and the roasting time of 40 to 120 seconds, while a roasting step according to the infra-red fashion is preferably carried out with the roasting temperature of 180 to 230° C., and the roasting time of 4 to 14 minutes.

3) Dehulling Step

It is recommended that skin of soybeans should be removed as it can increase the viscosity of the whole soybean milk product to be finally prepared afterwards and may cause residual taste (bitter and astringent taste) characteristic of soybean skin.

Accordingly, soybeans which went through the roasting step are rapidly cooled to 40° C. or lower, preferably 20 to 30° C., sorted according to size using a particle diameter sorter, followed by removing their skin using a dehuller, and diving the dehulled soybeans in half.

4) Cooking Step

Half-divided dehulled soybeans which went through the dehulling step are cooked in hot water with a temperature of 91 to 99° C., preferably 95 to 99° C. (e.g., 98° C.) for 3 to 10 minutes (e.g., 4 minutes).

Such cooking steps can not only effectively improve the sensory property of a whole soybean liquid by inactivating an agent causing beany flavour characteristic of beans, but also help improve the particle diameters of the whole soybean liquid by softening the soybean structure and thus easing the grinding in a coarse grinding step to be carried out afterward, but also can take a role in adding deep taste to the whole soybean liquid to be finally prepared. In addition, the productivity can be increased since, owing to the cooking step, a long soaking process of about 8 to 15 hours and an enzyme-inactivation process (carried out for 5 minutes at 98° C.) can be omitted, which have been carried out in pre-existing methods for the preparation of whole soybean milk.

5) Coarse Grinding Step

The cooked soybeans may be coarsely ground using a grinder such as Crusher.

In this step, cooked soybeans can be treated with 2.4 to 10-fold by weight of water and coarsely ground. The higher the solid content of the whole soybean liquid obtained from the coarse grinding process is, the more difficult it becomes to attain desired particle diameters in the fine grinding process afterwards, and thus it is recommended that the solid content of the soybean liquid obtained from the coarse grinding step be 5 to 15%.

One example of devices that can be used in the coarse grinding step of the present invention is Crusher in which the size of its passage net is 1 to 4 Φ, for example, 1.5 Φ.

6) Fine Grinding Step

Soybean particles can be micronized by finely grinding the coarsely ground soybean liquid obtained from the coarse grinding step, using Comitrol, a mechanical grinding device which finely grinds particles in a cutting manner.

The Comitrol used in the present invention is the main device which finely cuts particles and is composed of a circular head and an impeller located at the center of the head and equipped with blade rotating at a high speed.

Types of circular head in Comitrol are Cutting Head Assembly, Microcut Head Assembly, Slicing Head Assembly, etc.; and Microcut Head Assembly can be preferably used. Main components of Microcut Head Assembly are multiple blades, circular upper and under blade holding rings to which multiple blades are attached.

The principle of Comitrol's cutting and micronization of particles is as follows. An impeller equipped with blade cuts particles while rotating at a high speed, and centrifugal force and strong compressive force between the gap between Microcut Head Assembly and the impeller rotating at a high speed, etc. are generated, which make particles collide with the cutting surfaces of the blades attached to Microcut Head Assembly, resulting in cutting and micronization of particles. Among such micronized particles, only those which are smaller than the openings between the blades can pass, while those too large to pass get micronized repeatedly.

The Microcut Head Assembly can adjust particle diameters according to the number of blades attached (i.e., the more blades are attached, the narrower the openings between the blades get, which allows only the more micronized particles to pass). In addition, as the shape of the Microcut Head Assembly is circular, blades attached to the upper and lower blade holding rings do not align with the adjacent blades in a straight line, and differences in depth of cut are generated, which can maximize the efficiency of particle cutting.

Specifically, a fine grinding step of the present invention comprises first and second micronization steps of the coarsely ground soybean liquid using Comitrol. The Comitrol may have 50 to 222 blades in which the distance between blades ranges from 0.001 to 0.2214 inch and the difference in depth between cutting surfaces of a blade and another blade immediately next thereto ranges from 0.0012 to 0.0237 inch.

According to a specific embodiment of the present invention, Comitrol having 212 blades in which the distance between blades is 0.005 inch and the difference in depth between cutting surfaces of a blade and another blade immediately next thereto is 0.0013 inch (e.g., Comitrol Processor Model 1700, Urschel Lab., Inc.) can be used in the first micronization step; and Comitrol having 222 blades in which the distance between blades is 0.001 inch and the difference in depth between cutting surfaces of a blade and another blade immediately next thereto is 0.0012 inch (e.g., Comitrol Processor Model 1500, Urschel Lab., Inc.) can be used in the second micronization step.

The mean particle diameter of soybean particles obtained from the first and second micronization steps ranges from about 80 to 100 μm, and from about 60 to 70 μm, respectively.

Meanwhile, to process a large amount of coarsely ground whole soybean liquid in the fine grinding step of the present invention or to prepare a whole soybean liquid having a smaller particle diameter, the first and second micronization steps can be carried out using other models of Comitrol (e.g., Comitrol Processor Model 9300 with Feeder, Urschel Lab., Inc.). In such Comitrols, 172 to 241 blades are included, the distance between blades ranges from 0.00043 to 0.606 inch, and the difference in depth between cutting surfaces of a blade and another blade immediately next thereto ranges from 0.0001 to 0.042.

A grinding step in the conventional methods for preparing a whole soybean milk micronizes particles using Ultramizer and a reactor in a way of crushing particles by a milling stone method, and a resulting mean particle diameter of soybean particles ranges from about 130 to 150 μm. On the other hand, in the present invention, a whole soybean milk with a mean particle diameter (about 60 to 70 μm) smaller than the conventional methods can be obtained by micronizing particles in a way of cutting them with blades using Comitrol. According to a method of the present invention, soybean milk residue components with a large particle size decrease dramatically, enabling the hydration of soybean milk residue components to take place sufficiently during the process, and thus additional hydration of them does not take place over time. Accordingly, the viscosity of a whole soybean milk to be finally prepared gets stabilized, which can contribute to its storage stability. Moreover, the process can be simplified by not using additional processing devices such as Ultramizer and a reactor.

7) Micro Homogenization Step

The micro homogenization step of the present invention comprises first micro homogenizing the whole soybean liquid prepared in the grinding step at a homogeneous pressure of 200 to 300 bar (e.g., 300 bar); pasteurizing, cooling and sterilizing the whole soybean liquid obtained; and second micro homogenizing the sterilized whole soybean liquid at a homogeneous pressure of 150 to 300 bar (e.g., 300 bar).

The homogeneous pressure at the first micro homogenization step should be preferably 300 bar or less, since homogenous pressure exceeding 300 bar in the first micro homogenization step can cause unfavorable texture on tasting due to increased viscosity, and impose loads to a mechanical facility resulting in reduced life span of the facility or noise in the working area. The mean particle diameter of the whole soybean liquid obtained from the first micro homogenization step ranges from 45 to 55 μm.

Next, the whole soybean liquid obtained from the first micro homogenization step is pasteurized in a heat exchanger (e.g., plate-type heat exchanger) at 95 to 99° C. (e.g., about 98° C.) for 30 seconds to 60 seconds (e.g., about 30 seconds), followed by cooling to 10° C. or lower (e.g., about 5° C.) in a cooler. Then, it may be transported to a sterilizer and sterilized by a heat exchanger (e.g., a heat exchanger with a steam infusion method) at 135 to 151° C. (e.g., 150° C.) for 3 seconds to 200 seconds (e.g., 5 seconds).

The second micro homogenization of the sterilized whole soybean liquid obtained from the above process is carried out at a homogeneous pressure of 150 to 300 bar (e.g., 300 bar). The mean particle diameter of the whole soybean liquid obtained from the second micro homogenization process ranges from 25 to 35 μm.

In addition, the present invention provides a whole soybean milk prepared by the preparation method above.

Physical properties of the whole soybean milk according to the present invention include a particle diameter of about 25 to 35 and viscosity of 34 to 55 cP. The whole soybean milk has excellent storage stability due to almost no viscosity change over time, and is characterized by its small viscosity increase of less than 12 cP even after 22 months when stored in the form of a commercialized product at room temperature (about 1 to 35° C.).

For the distribution of the prepared whole soybean milk in a liquid phase at room temperature, a whole soybean milk product can be prepared by blending and mixing the whole soybean milk with a sitologically acceptable food and a small amount of additives, followed by a conventional process of packaging soybean milk products.

Accordingly, the present invention provides a method for preparing a whole soybean milk product comprising the steps of blending and mixing a whole soybean milk with a sitologically acceptable food and a small amount of additives, and then stabilizing, filling, sterilizing, and cooling the resulting mixture in a conventional way.

When preparing the soybean milk product, scent or taste of the final soybean milk product can be improved by adding flavoring agents to a whole soybean milk, and available flavoring agents can be, for example, fruit, fruit puree, juice, concentrate, powder, and a mixture thereof.

In addition, to promote health, a whole soybean milk product can be prepared with the addition of an appropriate amount of extracts or powders, etc. of milk calcium or various natural foods, for example, sesame seeds, black sesame seeds, carrots, spinach, green tea, black tea, mulberry, arrowroot, herbs, ginseng, red ginseng, Chinese bellflower, etc.

A feeling of repulsion starts to arise upon sensory evaluation if the viscosity of whole soybean milk exceeds 80 cP. A whole soybean milk product prepared according to a conventional process with a water-soaking method (Korean Patent No. 822,165) shows gradual increase in its viscosity over time, exceeding 80 cP after about 80 days, and exceeding 100 cP after about 180 days. However, the whole soybean milk prepared according to the method of the present invention showed almost no viscosity increase even 9 months after the preparation, and even showed about 5 to 18 cP decrease from the viscosity at the time of preparation. In addition, even until 22 months after the preparation, the viscosity increase was at maximum about 11.5 cP, which implies that there is almost no change in viscosity. Therefore, a longer shelf life can be achieved for the whole soybean milk product prepared according to the method of the present invention than that prepared according to the conventional process with water-soaking method.

EXAMPLES

Hereinafter, the present invention will be described in more detail with the following Examples. The following Examples are provided to illustrate the present invention, but the scope of the present invention is not limited thereto.

Example 1: Preparation of a Whole Soybean Milk

After carefully selecting soybeans and removing foreign materials from them, the soybeans were roasted in a flame fashion for 10 minutes using a roaster (Drum Roaster available from Korea Energy Technology) with the inside temperature of the drum just before the soybean input and the rotational speed of the drum fixed at about 220° C. and at about 27 rpm, respectively. The roasted soybeans were cooled quickly to about 30° C., were sorted according to the size using a particle diameter sorter, and were half-divided after their hull was removed using a dehuller.

The dehulled half-divided soybeans were cooked by bean cooker by passing them in hot water of 98° C., for about 4 minutes. 7.45-fold by weight of water was added to the cooked soybeans obtained and the resulting was coarsely ground by passing it through Crusher (Seikensha Co., Ltd., Japan) which has a passage net of 1.5 Φ.

In order to finely grind the coarsely ground soybean liquid obtained, a first micronization was carried out by cutting it with Comitrol (Comitrol Processor Model 1700, Urschel Lab., Inc.) having 212 blades in which the distance between blades is 0.005 inch and the difference in depth between cutting surfaces of a blade and another blade immediately next thereto is 0.0013 inch. The mean particle diameter of the soybean liquid obtained from the first micronization process was measured using a particle diameter analyzer (Microtrac S-3000, Microtrac Inc., USA), which was shown to be 80.99 μm (FIG. 2 and Table 1).

TABLE 1

| SIZE | % PASS | % CHAN |
|---|---|---|
| 1408 | 100.00 | 0.00 |
| 1184 | 100.00 | 0.00 |
| 995.6 | 100.00 | 0.00 |
| 837.2 | 100.00 | 0.00 |
| 704.0 | 100.00 | 0.00 |
| 592.0 | 100.00 | 0.00 |
| 497.8 | 100.00 | 0.00 |
| 418.6 | 100.00 | 0.37 |
| 352.0 | 99.63 | 0.94 |
| 296.0 | 98.69 | 1.75 |
| 248.9 | 96.94 | 2.63 |
| 209.3 | 94.31 | 3.51 |
| 176.0 | 90.80 | 4.45 |
| 148.0 | 86.35 | 5.38 |
| 124.5 | 80.97 | 6.05 |
| 104.7 | 74.92 | 6.72 |
| 88.00 | 68.20 | 8.19 |
| 74.00 | 60.01 | 10.07 |
| 62.23 | 49.94 | 10.54 |
| 52.33 | 39.40 | 9.06 |
| 44.00 | 30.34 | 6.37 |
| 37.00 | 23.97 | 4.62 |
| 31.11 | 19.35 | 3.71 |
| 26.16 | 15.64 | 3.00 |
| 22.00 | 12.64 | 2.43 |
| 18.50 | 10.21 | 1.99 |
| 15.56 | 8.22 | 1.37 |
| 13.08 | 6.85 | 1.16 |
| 11.00 | 5.69 | 1.47 |
| 9.250 | 4.22 | 1.11 |
| 7.778 | 3.11 | 0.64 |
| 6.541 | 2.47 | 0.74 |
| 5.500 | 1.73 | 0.87 |
| 4.625 | 0.86 | 0.53 |
| 3.889 | 0.33 | 0.33 |
| 3.270 | 0.00 | 0.00 |
| 2.750 | 0.00 | 0.00 |
| 2.312 | 0.00 | 0.00 |
| 1.945 | 0.00 | 0.00 |
| 1.635 | 0.00 | 0.00 |
| 1.375 | 0.00 | 0.00 |
| 1.156 | 0.00 | 0.00 |
| 0.972 | 0.00 | 0.00 |
| 0.818 | 0.00 | 0.00 |
| 0.688 | 0.00 | 0.00 |

TABLE 1-continued

| SIZE | % PASS | % CHAN |
|---|---|---|
| 0.578 | 0.00 | 0.00 |
| 0.486 | 0.00 | 0.00 |
| 0.409 | 0.00 | 0.00 |
| 0.344 | 0.00 | 0.00 |
| 0.289 | 0.00 | 0.00 |

Figure 3:
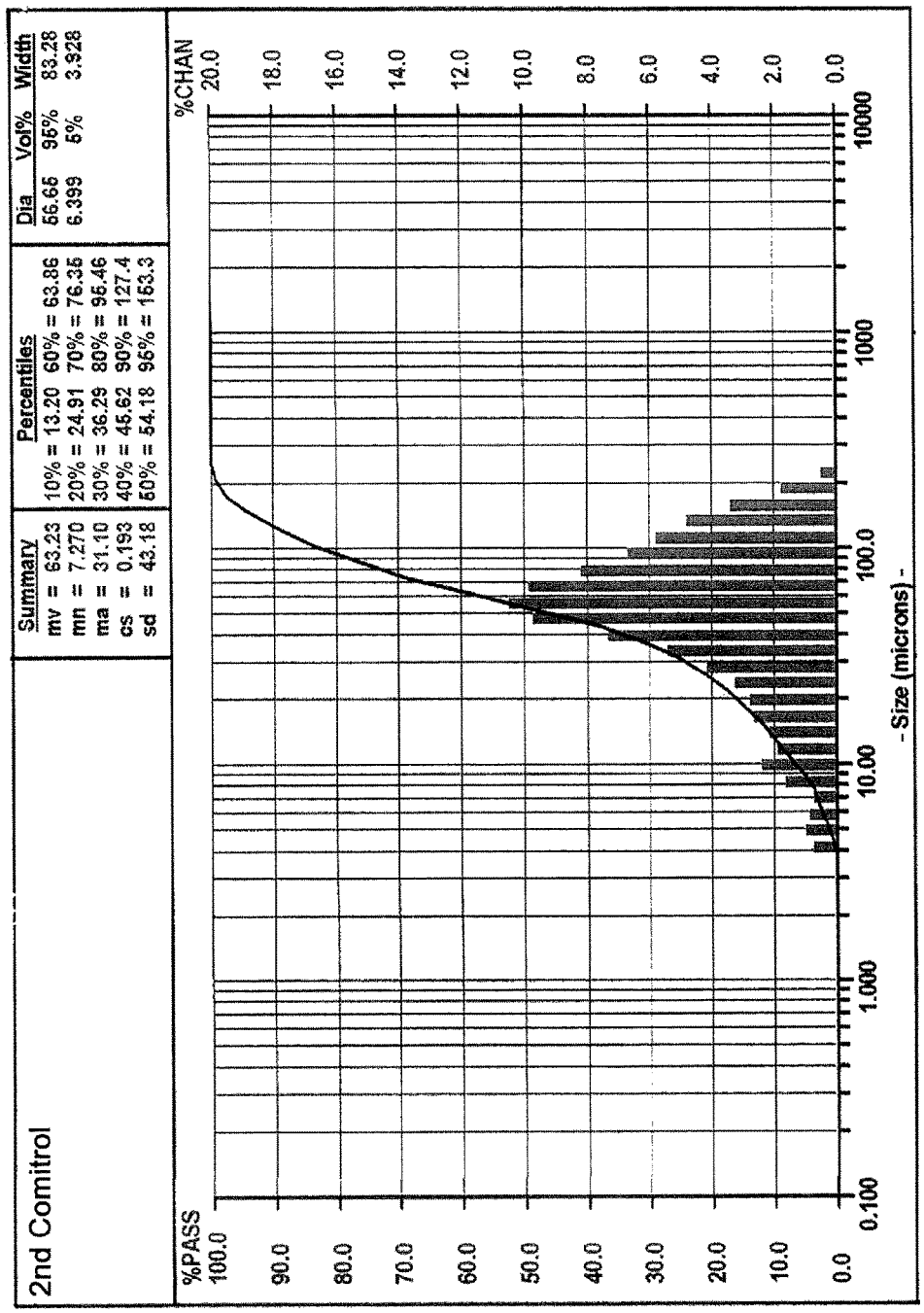

Then, a second micronization of the soybean liquid obtained from the first micronization process was carried out by cutting it with Comitrol (Comitrol Processor Model 1500, Urschel Lab., Inc.) having 222 blades in which the distance between blades is 0.001 inch and the difference in depth between cutting surfaces of a blade and another blade immediately next thereto is 0.0012 inch. The mean particle diameter of the soybean liquid obtained from the second micronization process was measured by the same method as above, which was confirmed to be 63.23 µm (FIG. 3 and Table 2).

TABLE 2

| SIZE | % PASS | % CHAN |
|---|---|---|
| 1408 | 100.00 | 0.00 |
| 1184 | 100.00 | 0.00 |
| 995.6 | 100.00 | 0.00 |
| 837.2 | 100.00 | 0.00 |
| 704.0 | 100.00 | 0.00 |
| 592.0 | 100.00 | 0.00 |
| 497.8 | 100.00 | 0.00 |
| 418.6 | 100.00 | 0.00 |
| 352.0 | 100.00 | 0.00 |
| 296.0 | 100.00 | 0.00 |
| 248.9 | 100.00 | 0.54 |
| 209.3 | 99.46 | 1.80 |
| 176.0 | 97.66 | 3.48 |
| 148.0 | 94.18 | 4.87 |
| 124.5 | 89.31 | 5.85 |
| 104.7 | 83.46 | 6.79 |
| 88.00 | 76.67 | 8.27 |
| 74.00 | 68.40 | 9.94 |
| 62.23 | 58.46 | 10.56 |
| 52.33 | 47.90 | 9.78 |
| 44.00 | 38.12 | 7.43 |
| 37.00 | 30.69 | 5.46 |
| 31.11 | 25.23 | 4.22 |
| 26.16 | 21.01 | 3.34 |
| 22.00 | 17.67 | 2.91 |
| 18.50 | 14.76 | 2.70 |
| 15.56 | 12.06 | 2.16 |
| 13.08 | 9.90 | 1.96 |
| 11.00 | 7.94 | 2.49 |
| 9.250 | 5.45 | 1.74 |
| 7.778 | 3.71 | 0.87 |
| 6.541 | 2.84 | 0.97 |
| 5.500 | 1.87 | 1.03 |
| 4.625 | 0.84 | 0.84 |
| 3.889 | 0.00 | 0.00 |
| 3.270 | 0.00 | 0.00 |
| 2.750 | 0.00 | 0.00 |
| 2.312 | 0.00 | 0.00 |
| 1.945 | 0.00 | 0.00 |
| 1.635 | 0.00 | 0.00 |
| 1.375 | 0.00 | 0.00 |
| 1.156 | 0.00 | 0.00 |
| 0.972 | 0.00 | 0.00 |
| 0.818 | 0.00 | 0.00 |
| 0.688 | 0.00 | 0.00 |
| 0.578 | 0.00 | 0.00 |
| 0.486 | 0.00 | 0.00 |
| 0.409 | 0.00 | 0.00 |
| 0.344 | 0.00 | 0.00 |
| 0.289 | 0.00 | 0.00 |

Figure 4:
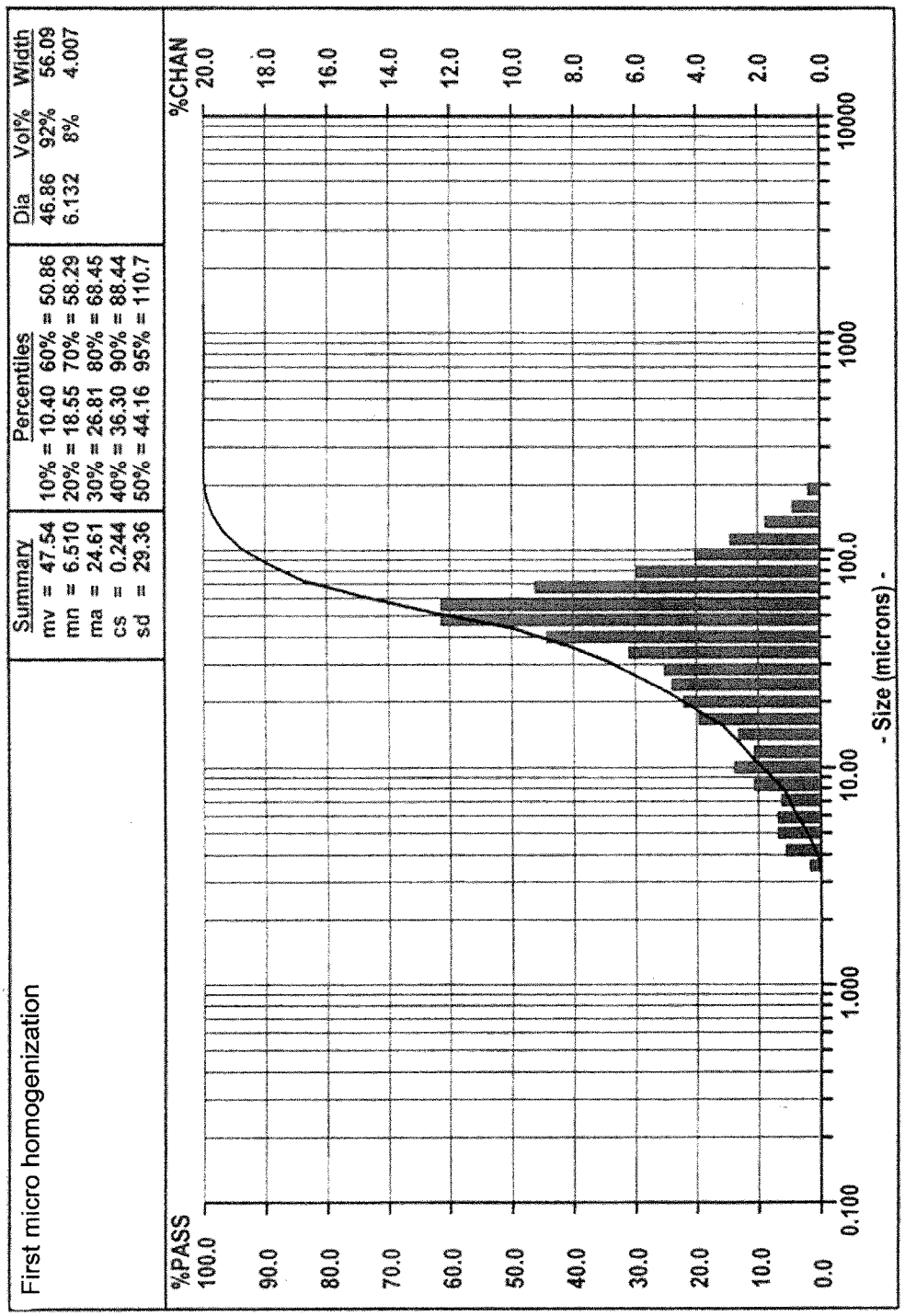
FIG. 4 shows results of particle diameter analysis of the soybean liquid after a first micro homogenization of the present invention.

A first micro homogenization of the whole soybean liquid obtained from the above micronization processes was carried out using a homogenizer (Homogenizer, Donga Homogenizer, China) at a pressure of 300 bar. The mean particle diameter of the whole soybean liquid obtained was measured by the same method as above, which was confirmed to be 47.54 µm (FIG. 4 and Table 3).

TABLE 3

| SIZE | % PASS | % CHAN |
|---|---|---|
| 1408 | 100.00 | 0.00 |
| 1184 | 100.00 | 0.00 |
| 995.6 | 100.00 | 0.00 |
| 837.2 | 100.00 | 0.00 |
| 704.0 | 100.00 | 0.00 |
| 592.0 | 100.00 | 0.00 |
| 497.8 | 100.00 | 0.00 |
| 418.6 | 100.00 | 0.00 |
| 352.0 | 100.00 | 0.00 |
| 296.0 | 100.00 | 0.00 |
| 248.9 | 100.00 | 0.00 |
| 209.3 | 100.00 | 0.38 |
| 176.0 | 99.62 | 0.89 |
| 148.0 | 98.73 | 1.83 |
| 124.5 | 96.90 | 2.96 |
| 104.7 | 93.94 | 4.07 |
| 88.00 | 89.87 | 6.06 |
| 74.00 | 83.81 | 9.36 |
| 62.23 | 74.45 | 12.31 |
| 52.33 | 62.14 | 12.38 |
| 44.00 | 49.76 | 8.97 |
| 37.00 | 40.79 | 6.31 |
| 31.11 | 34.48 | 5.18 |
| 26.16 | 29.30 | 4.82 |
| 22.00 | 24.48 | 4.55 |
| 18.50 | 19.93 | 4.03 |
| 15.56 | 15.90 | 2.76 |
| 13.08 | 13.14 | 2.24 |
| 11.00 | 10.90 | 2.87 |
| 9.250 | 8.03 | 2.24 |
| 7.778 | 5.79 | 1.27 |
| 6.541 | 4.52 | 1.42 |
| 5.500 | 3.10 | 1.50 |
| 4.625 | 1.60 | 1.18 |
| 3.889 | 0.42 | 0.42 |
| 3.270 | 0.00 | 0.00 |
| 2.750 | 0.00 | 0.00 |
| 2.312 | 0.00 | 0.00 |
| 1.945 | 0.00 | 0.00 |
| 1.635 | 0.00 | 0.00 |
| 1.375 | 0.00 | 0.00 |
| 1.156 | 0.00 | 0.00 |
| 0.972 | 0.00 | 0.00 |
| 0.818 | 0.00 | 0.00 |
| 0.688 | 0.00 | 0.00 |
| 0.578 | 0.00 | 0.00 |
| 0.486 | 0.00 | 0.00 |
| 0.409 | 0.00 | 0.00 |
| 0.344 | 0.00 | 0.00 |
| 0.289 | 0.00 | 0.00 |

Then, the whole soybean liquid obtained from the first micro homogenization was pasteurized using a plate-type heat exchanger at about 98° C. for 30 seconds, followed by cooling down to about 5° C. using a plate-type heat exchanger. Then, it was transported to a sterilizer and sterilized by a heat exchanger with a steam infusion method at 150° C. for 5 seconds.

Figure 5:
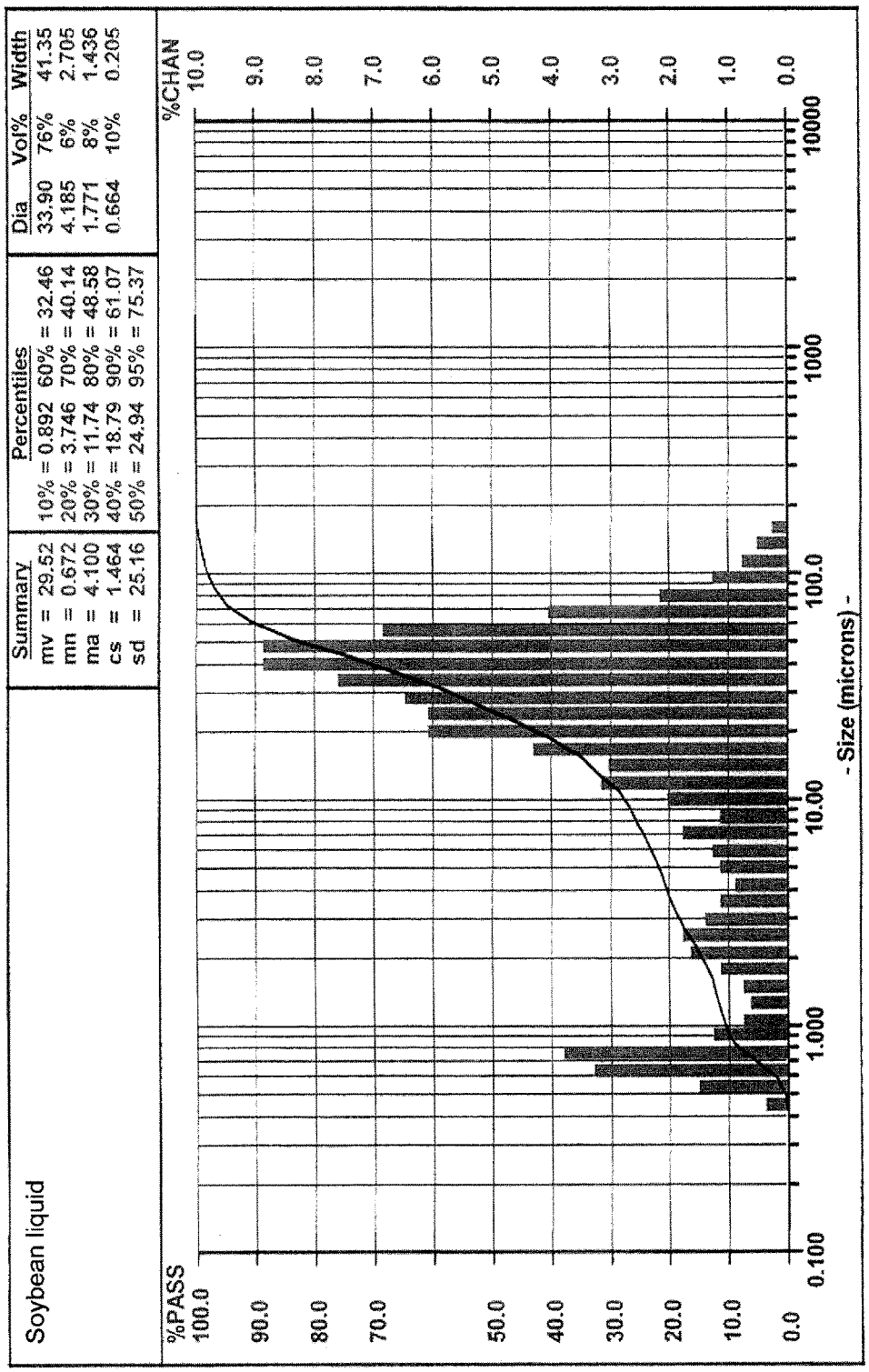
FIG. 5 shows results of particle diameter analysis of the soybean liquid after a second homogenization of the whole soybean liquid into the micro size of particles of the present invention.

A second micro homogenization of the sterilized whole soybean liquid obtained from the above process was carried out at a pressure of 300 bar. The mean particle diameter of the whole soybean liquid obtained from the second micro homogenization was confirmed to be 29.52 µm (FIG. 5 and Table 4).

TABLE 4

| SIZE | % PASS | % CHAN |
| --- | --- | --- |
| 1408 | 100.00 | 0.00 |
| 1184 | 100.00 | 0.00 |
| 995.6 | 100.00 | 0.00 |
| 837.2 | 100.00 | 0.00 |
| 704.0 | 100.00 | 0.00 |
| 592.0 | 100.00 | 0.00 |
| 497.8 | 100.00 | 0.00 |
| 418.6 | 100.00 | 0.00 |
| 352.0 | 100.00 | 0.00 |
| 296.0 | 100.00 | 0.00 |
| 248.9 | 100.00 | 0.00 |
| 209.3 | 100.00 | 0.00 |
| 176.0 | 100.00 | 0.35 |
| 148.0 | 99.65 | 0.55 |
| 124.5 | 99.10 | 0.84 |
| 104.7 | 98.26 | 1.29 |
| 88.00 | 96.97 | 2.26 |
| 74.00 | 94.71 | 4.06 |
| 62.23 | 90.65 | 6.95 |
| 52.33 | 83.70 | 8.89 |
| 44.00 | 74.81 | 8.89 |
| 37.00 | 65.92 | 7.68 |
| 31.11 | 58.24 | 6.55 |
| 26.16 | 51.69 | 6.08 |
| 22.00 | 45.61 | 6.11 |
| 18.50 | 39.50 | 4.35 |
| 15.56 | 35.15 | 3.05 |
| 13.08 | 32.10 | 3.26 |
| 11.00 | 28.84 | 2.12 |
| 9.250 | 26.72 | 1.19 |
| 7.778 | 25.53 | 1.78 |
| 6.541 | 23.75 | 1.33 |
| 5.500 | 22.42 | 1.18 |
| 4.625 | 21.24 | 1.01 |
| 3.889 | 20.23 | 1.16 |
| 3.270 | 19.07 | 1.51 |
| 2.750 | 17.56 | 1.81 |
| 2.312 | 15.75 | 1.68 |
| 1.945 | 14.07 | 1.20 |
| 1.635 | 12.87 | 0.82 |
| 1.375 | 12.05 | 0.71 |
| 1.156 | 11.34 | 0.88 |
| 0.972 | 10.46 | 1.29 |
| 0.818 | 9.17 | 3.83 |
| 0.688 | 5.34 | 3.34 |
| 0.578 | 2.00 | 1.58 |
| 0.486 | 0.42 | 0.42 |
| 0.409 | 0.00 | 0.00 |
| 0.344 | 0.00 | 0.00 |
| 0.289 | 0.00 | 0.00 |

Comparative Example 1: Preparation of a Whole Soybean Milk

A whole soybean milk was prepared according to the method described in Korean Patent No. 822,165.

Specifically, after carefully selecting soybeans and removing foreign materials, 330 kg of the soybeans were soaked in water of 18° C. for about 10 hours. First grinding of the soaked soybeans was carried out using a grinder (Crusher, Seikensha Co., Ltd., Japan) while adding purified water thereto. After the grinding, outer skins of soybeans or foreign materials contained in the ground liquid were removed three times using a refiner (Bertuzzi, Italy). Then, second grinding was carried out using a fine grinder (Ultramizer). The mean particle diameter of the whole soybean liquid obtained from the second grinding process was confirmed to be 450 μm.

Then, the ground liquid was maintained at 90° C. for 2 minutes to inactivate enzymes, and was micronized using a circulating grinding device (Hansung Pulverizing Machinery Co., Ltd.) equipped with a mechanical grinding device such as Colloid Mill, etc., and a recirculating device, to prepare a whole soybean liquid. The mean particle diameter of the whole soybean liquid was confirmed to be about 130 μm.

Figure 6:
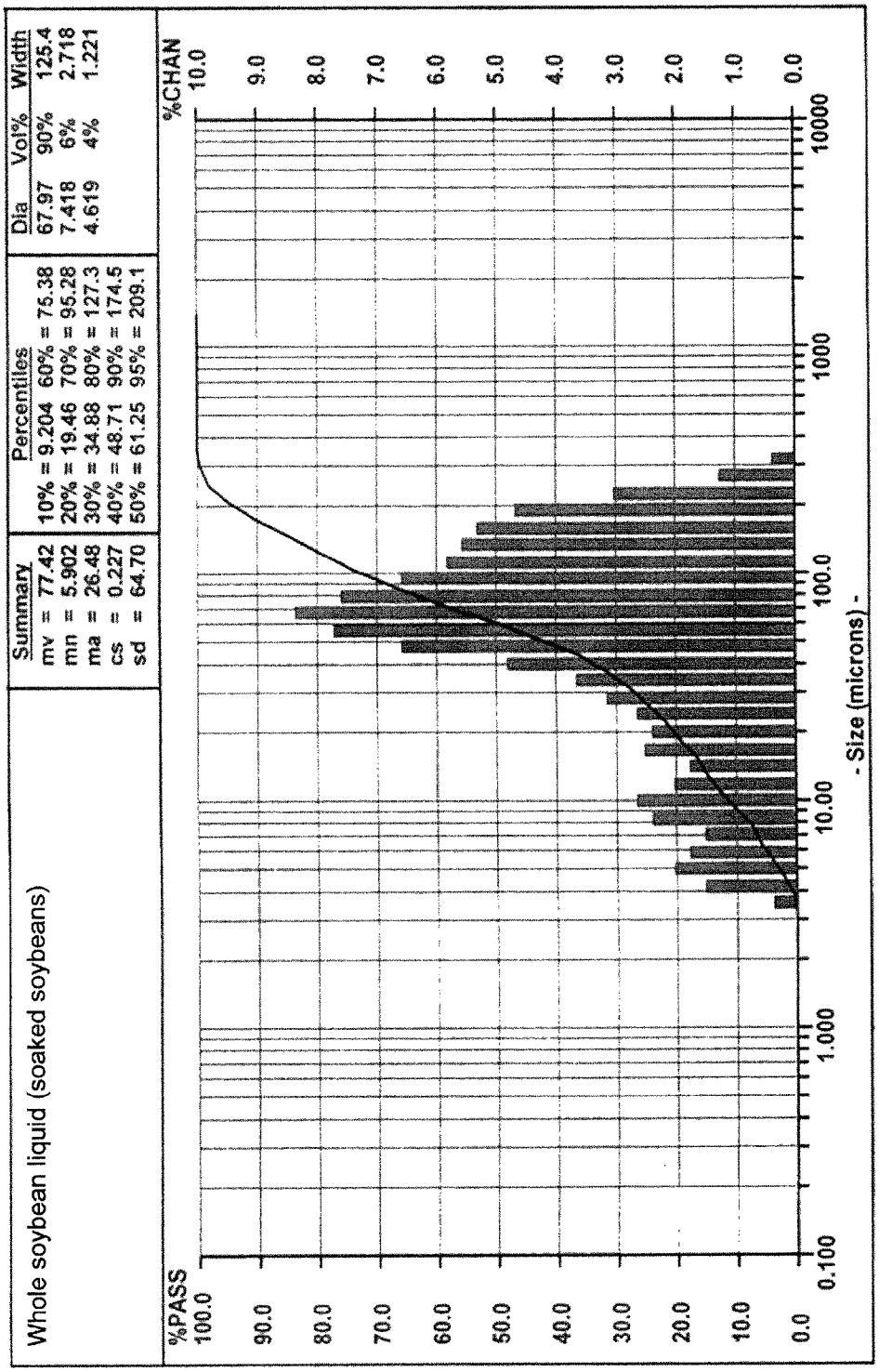
FIG. 6 shows results of particle diameter analysis of the soybean liquid prepared in Comparative Example 1.

Two consecutive homogenizations of the prepared whole soybean liquid were carried out using a ultra-high pressure homogenizer (Homogenizer, Donga Homogenizer, China) at a pressure of 400 bar each, and the whole soybean liquid was cooled to 4° C. The obtained liquid was subjected to a third homogenization at a pressure of 400 bar and then sterilization at 150° C. for 3 seconds, to prepare a whole soybean liquid. The final mean particle diameter of the prepared whole soybean liquid was 77.42 μm (FIG. 6 and Table 5).

TABLE 5

| SIZE | % PASS | % CHAN |
| --- | --- | --- |
| 1408 | 100.00 | 0.00 |
| 1184 | 100.00 | 0.00 |
| 995.6 | 100.00 | 0.00 |
| 837.2 | 100.00 | 0.00 |
| 704.0 | 100.00 | 0.00 |
| 592.0 | 100.00 | 0.00 |
| 497.8 | 100.00 | 0.00 |
| 418.6 | 100.00 | 0.00 |
| 352.0 | 100.00 | 0.44 |
| 296.0 | 99.56 | 1.38 |
| 248.9 | 98.18 | 3.15 |
| 209.3 | 95.03 | 4.77 |
| 176.0 | 90.26 | 5.39 |
| 148.0 | 84.87 | 5.59 |
| 124.5 | 79.28 | 5.83 |
| 104.7 | 73.45 | 6.59 |
| 88.00 | 66.86 | 7.71 |
| 74.00 | 59.15 | 8.39 |
| 62.23 | 50.76 | 7.84 |
| 52.33 | 42.92 | 6.62 |
| 44.00 | 36.30 | 4.92 |
| 37.00 | 31.38 | 3.77 |
| 31.11 | 27.61 | 3.17 |
| 26.16 | 24.44 | 2.67 |
| 22.00 | 21.77 | 2.51 |
| 18.50 | 19.26 | 2.57 |
| 15.56 | 16.69 | 1.83 |
| 13.08 | 14.86 | 2.05 |
| 11.00 | 12.81 | 2.73 |
| 9.250 | 10.08 | 2.50 |
| 7.778 | 7.58 | 1.60 |
| 6.541 | 5.98 | 1.87 |
| 5.500 | 4.11 | 2.04 |
| 4.625 | 2.07 | 1.58 |
| 3.889 | 0.49 | 0.49 |
| 3.270 | 0.00 | 0.00 |
| 2.750 | 0.00 | 0.00 |
| 2.312 | 0.00 | 0.00 |
| 1.945 | 0.00 | 0.00 |
| 1.635 | 0.00 | 0.00 |
| 1.375 | 0.00 | 0.00 |
| 1.156 | 0.00 | 0.00 |
| 0.972 | 0.00 | 0.00 |
| 0.818 | 0.00 | 0.00 |
| 0.688 | 0.00 | 0.00 |
| 0.578 | 0.00 | 0.00 |
| 0.486 | 0.00 | 0.00 |
| 0.409 | 0.00 | 0.00 |
| 0.344 | 0.00 | 0.00 |
| 0.289 | 0.00 | 0.00 |

Experimental Example 1: Characteristics of Whole Soybean Milk

Particle diameters and viscosity of the Example 1 and Comparative Example 1, and commercially available soybean milk products A and B were measured using a particle diameter analyzer (Microtrac S-3000, Microtrac Inc., USA)

and a viscosity analyzer (Brookfield Viscometer LVDVE230E5871, spindle No. 1 (S61), and spindle rotational speed: 20 rpm). The results are shown in Table 6 below.

Figure 7:
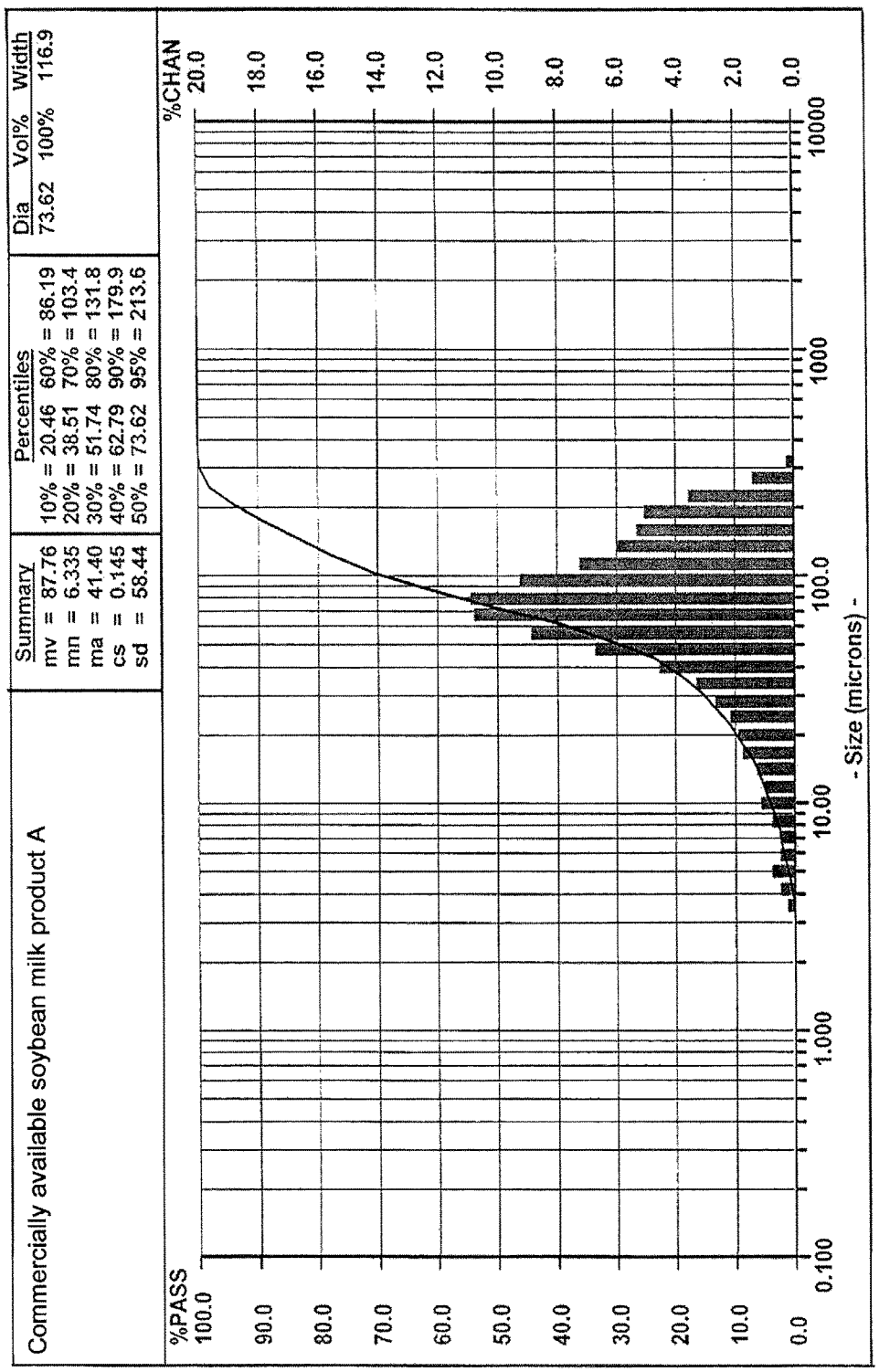
FIGS. 7 and 8 show results of particle diameter analysis of soybean milk products A and B, respectively, which are commercially available.
Figure 8:
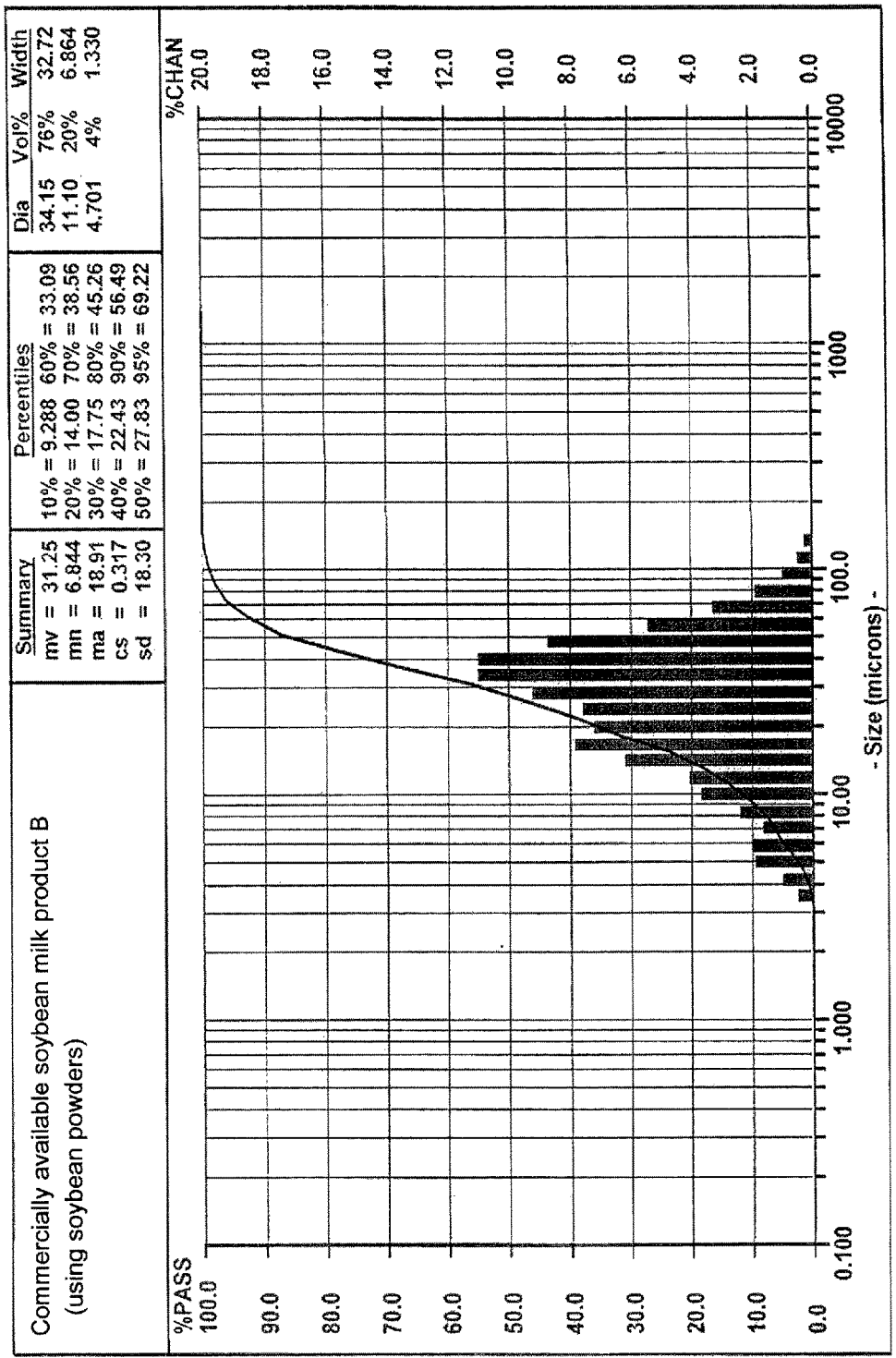

In addition, the results of particle diameter analysis of Comparative Example 1, and commercially available soybean milk products A and B are shown, respectively, in FIGS. 6 to 8 (Tables 5, 7, and 8).

TABLE 6

|  | Ex. 1 | Comp. Ex. 1 | A | B |
|---|---|---|---|---|
| Particle diameter | 29.52 | 77.42 | 85.48 | 32.14 |
| Viscosity | 42.2 | 58.6 | 60.9 | 24.0 |

TABLE 7

Soybean Milk Product A

| SIZE | % PASS | % CHAN |
|---|---|---|
| 1408 | 100.00 | 0.00 |
| 1184 | 100.00 | 0.00 |
| 995.6 | 100.00 | 0.00 |
| 837.2 | 100.00 | 0.00 |
| 704.0 | 100.00 | 0.00 |
| 592.0 | 100.00 | 0.00 |
| 497.8 | 100.00 | 0.00 |
| 418.6 | 100.00 | 0.00 |
| 352.0 | 100.00 | 0.36 |
| 296.0 | 99.64 | 1.48 |
| 248.9 | 98.16 | 3.67 |
| 209.3 | 94.49 | 5.16 |
| 176.0 | 89.33 | 5.42 |
| 148.0 | 83.91 | 5.97 |
| 124.5 | 77.94 | 7.32 |
| 104.7 | 70.62 | 9.34 |
| 88.00 | 61.28 | 10.94 |
| 74.00 | 50.34 | 10.87 |
| 62.23 | 39.47 | 8.96 |
| 52.33 | 30.51 | 6.81 |
| 44.00 | 23.70 | 4.62 |
| 37.00 | 19.08 | 3.32 |
| 31.11 | 15.76 | 2.69 |
| 26.16 | 13.07 | 2.22 |
| 22.00 | 10.85 | 1.98 |
| 18.50 | 8.87 | 1.79 |
| 15.56 | 7.08 | 1.32 |
| 13.08 | 5.76 | 1.05 |
| 11.00 | 4.71 | 1.16 |
| 9.250 | 3.55 | 0.80 |
| 7.778 | 2.75 | 0.57 |
| 6.541 | 2.18 | 0.56 |
| 5.500 | 1.62 | 0.76 |
| 4.625 | 0.86 | 0.51 |
| 3.889 | 0.35 | 0.35 |
| 3.270 | 0.00 | 0.00 |
| 2.750 | 0.00 | 0.00 |
| 2.312 | 0.00 | 0.00 |
| 1.945 | 0.00 | 0.00 |
| 1.635 | 0.00 | 0.00 |
| 1.375 | 0.00 | 0.00 |
| 1.156 | 0.00 | 0.00 |
| 0.972 | 0.00 | 0.00 |
| 0.818 | 0.00 | 0.00 |
| 0.688 | 0.00 | 0.00 |
| 0.578 | 0.00 | 0.00 |
| 0.486 | 0.00 | 0.00 |
| 0.409 | 0.00 | 0.00 |
| 0.344 | 0.00 | 0.00 |
| 0.289 | 0.00 | 0.00 |

TABLE 8

Soybean Milk Product B

| SIZE | % PASS | % CHAN |
|---|---|---|
| 1408 | 100.00 | 0.00 |
| 1184 | 100.00 | 0.00 |
| 995.6 | 100.00 | 0.00 |
| 837.2 | 100.00 | 0.00 |
| 704.0 | 100.00 | 0.00 |
| 592.0 | 100.00 | 0.00 |
| 497.8 | 100.00 | 0.00 |
| 418.6 | 100.00 | 0.00 |
| 352.0 | 100.00 | 0.00 |
| 296.0 | 100.00 | 0.00 |
| 248.9 | 100.00 | 0.00 |
| 209.3 | 100.00 | 0.00 |
| 176.0 | 100.00 | 0.00 |
| 148.0 | 100.00 | 0.33 |
| 124.5 | 99.67 | 0.59 |
| 104.7 | 99.08 | 1.05 |
| 88.00 | 98.03 | 1.93 |
| 74.00 | 96.10 | 3.34 |
| 62.23 | 92.76 | 5.54 |
| 52.33 | 87.22 | 8.83 |
| 44.00 | 78.39 | 11.11 |
| 37.00 | 67.28 | 11.07 |
| 31.11 | 56.21 | 9.31 |
| 26.16 | 46.90 | 7.71 |
| 22.00 | 39.19 | 7.29 |
| 18.50 | 31.90 | 7.86 |
| 15.56 | 24.04 | 6.21 |
| 13.08 | 17.83 | 4.14 |
| 11.00 | 13.69 | 3.77 |
| 9.250 | 9.92 | 2.52 |
| 7.778 | 7.40 | 1.65 |
| 6.541 | 5.75 | 2.04 |
| 5.500 | 3.71 | 2.02 |
| 4.625 | 1.69 | 1.13 |
| 3.889 | 0.56 | 0.56 |
| 3.270 | 0.00 | 0.00 |
| 2.750 | 0.00 | 0.00 |
| 2.312 | 0.00 | 0.00 |
| 1.945 | 0.00 | 0.00 |
| 1.635 | 0.00 | 0.00 |
| 1.375 | 0.00 | 0.00 |
| 1.156 | 0.00 | 0.00 |
| 0.972 | 0.00 | 0.00 |
| 0.818 | 0.00 | 0.00 |
| 0.688 | 0.00 | 0.00 |
| 0.578 | 0.00 | 0.00 |
| 0.486 | 0.00 | 0.00 |
| 0.409 | 0.00 | 0.00 |
| 0.344 | 0.00 | 0.00 |
| 0.289 | 0.00 | 0.00 |

Experimental Example 2: Measurement of Viscosity Changes Over Time

Whole soybean milks prepared in Example 1 and Comparative Example 1 were sterilized at 150° C. for 3 to 5 seconds, and were commercialized by packaging them using a sterile automatic packaging machine (Combibloc-filling machine CFA112-32, SIG Combibloc).

In order to measure the viscosity changes according to storage time, products of Example 1 and Comparative Example 1 were stored at room temperature and the viscosity increase over storage time was measured by the same method as Experimental Example 1. Results are shown in Tables 9 and 10 below, and FIGS. 9 and 10.

TABLE 9

Viscosity changes of the whole soybean milk of Example 1

| Production date | Elapsed days (Analysis date – Production date) | Viscosity (cP) At production | Viscosity (cP) When time elapsed | Viscosity Increase (cP) |
|---|---|---|---|---|
| Jul. 1, 2012 | 23 days | 48.0 | 42.3 | -5.7 |
| Jun. 29, 2012 | 25 days | 49.1 | 44.4 | -4.7 |
| Jun. 25, 2012 | 29 days | 46.7 | 39.8 | -6.9 |
| Jun. 23, 2012 | 31 days | 47.4 | 40.5 | -6.9 |
| May 28, 2012 | 57 days | 43.9 | 38.7 | -5.2 |
| May 27, 2012 | 58 days | 48.3 | 34.4 | -13.9 |
| May 19, 2012 | 66 days | 48.6 | 40.5 | -8.1 |
| May 11, 2012 | 74 days | 46.2 | 45.6 | -0.6 |
| Apr. 30, 2012 | 85 days | 47.2 | 39.3 | -7.9 |
| Apr. 22, 2012 | 93 days | 46.0 | 34.2 | -11.8 |
| Apr. 9, 2012 | 106 days | 42.1 | 32.4 | -9.7 |
| Mar. 26, 2012 | 120 days | 42.3 | 36.2 | -6.1 |
| Mar. 20, 2012 | 126 days | 48.8 | 30.1 | -18.7 |
| Mar. 10, 2012 | 136 days | 49.5 | 36.7 | -12.8 |
| Mar. 2, 2012 | 144 days | 49.1 | 41.3 | -7.8 |
| Feb. 17, 2012 | 158 days | 54.3 | 45.2 | -9.1 |
| Feb. 6, 2012 | 169 days | 54.3 | 47.1 | -7.2 |
| Feb. 2, 2012 | 173 days | 49.4 | 42.1 | -7.3 |
| Jan. 29, 2012 | 177 days | 45.3 | 39.0 | -6.3 |
| Jan. 10, 2012 | 196 days | 48.9 | 39.2 | -9.7 |
| Dec. 7, 2011 | 230 days | 48.5 | 43.8 | -4.7 |
| Nov. 28, 2011 | 239 days | 44.9 | 42.3 | -2.6 |
| Nov. 26, 2011 | 241 days | 44.6 | 39.0 | -5.6 |
| Nov. 17, 2011 | 250 days | 46.0 | 42.0 | -4.0 |
| Oct. 22, 2011 | 276 days | 38.3 | 42.0 | 3.7 |
| Sep. 27, 2011 | 301 days | 43.1 | 54.6 | 11.5 |
| Sep. 15, 2010 | 678 days | 34.9 | 44.1 | 9.2 |
| Sep. 15, 2010 | 678 days | 34.9 | 40.8 | 5.9 |

TABLE 10

Viscosity changes of the whole soybean milk of Comparative Example 1 (Product Specification: Viscosity of 120 cP or less)

| Production date | Elapsed days (Analysis date – Production date) | Viscosity (cP) At production | Viscosity (cP) When time elapsed | Viscosity Increase (cP) |
|---|---|---|---|---|
| Mar. 10, 2008 | 7 days | 84 | 80 | -4 |
| Feb. 18, 2008 | 28 days | 58 | 61 | 3 |
| Feb. 14, 2008 | 32 days | 74 | 70 | -4 |
| Feb. 5, 2008 | 41 days | 80 | 85 | 5 |
| Jan. 7, 2008 | 70 days | 62 | 70 | 8 |
| Dec. 28, 2007 | 80 days | 68 | 77 | 9 |
| Dec. 10, 2007 | 98 days | 87 | 112 | 25 |
| Nov. 27, 2007 | 111 days | 76 | 168 | 92 |
| Nov. 23, 2007 | 115 days | 64 | 79 | 15 |
| Oct. 29, 2007 | 140 days | 41 | 80 | 39 |
| Oct. 15, 2007 | 154 days | 52 | 82 | 30 |
| Oct. 10, 2007 | 159 days | 49 | 82 | 33 |
| Sept. 17. 2007 | 182 days | 54 | 97 | 43 |
| Aug. 27, 2007 | 203 days | 68 | 110 | 42 |
| Aug. 21, 2007 | 209 days | 49 | 87 | 38 |
| Aug. 8, 2007 | 222 days | 56 | 115 | 59 |
| Mar. 25, 2006 | 722 days | 80 | 177 | 97 |

Figure 9:
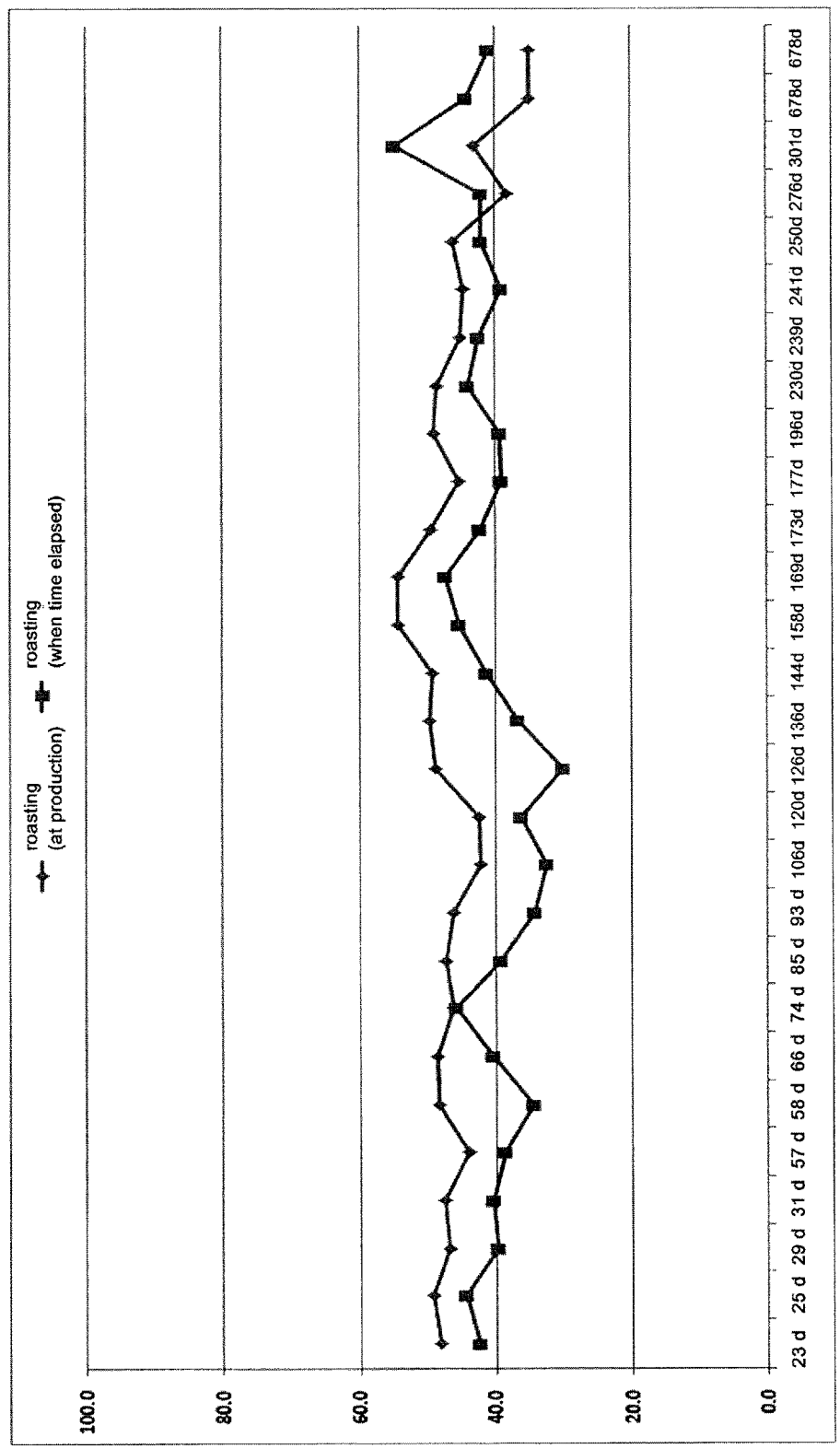
FIGS. 9 and 10 show results of viscosity changes according to elapsed time of whole soybean milks prepared in Example 1 and Comparative Example 1, respectively.
Figure 10:
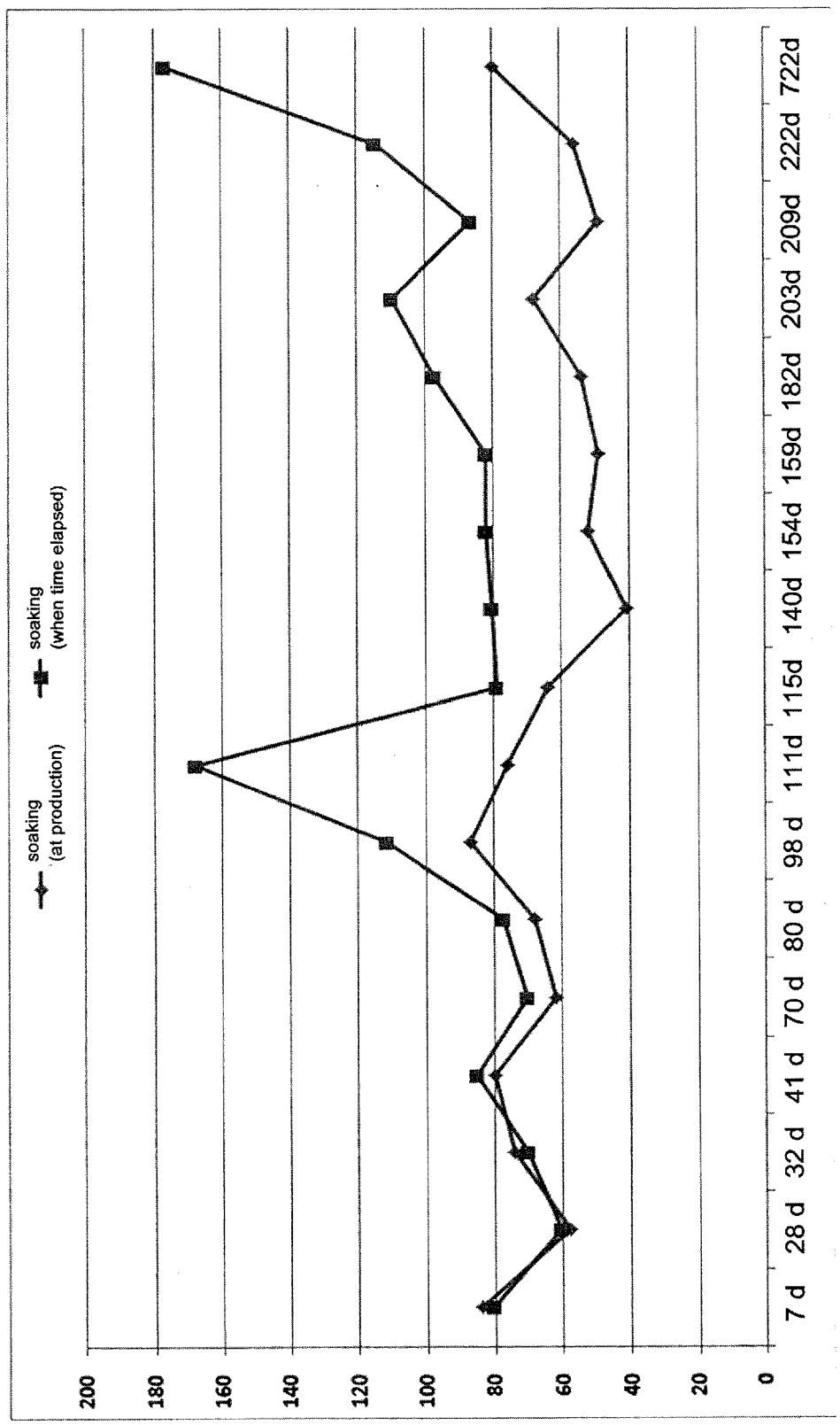

As shown in Tables 9 and 10, and FIGS. 9 and 10, the whole soybean milk of Example 1 showed no viscosity increase at 9 months after the preparation, but rather showed about 5 to 18 cP decrease from the viscosity at the time of preparation. In addition, even until 22 months after the preparation, the viscosity increase was at maximum about 11.5 cP, which implies that there was almost no change in viscosity.

On the other hand, the whole soybean milk of Comparative Example 1 showed gradual increase in its viscosity over time, exceeding 80 cP after about 80 days, and exceeding 100 cP after about 180 days.

A feeling of repulsion starts to arise upon sensory evaluation if the viscosity of a whole soybean milk exceeds 80 cP. These results indicate that products using a whole soybean milk of Example 1 can be stored for a longer period without change in taste than those using a whole soybean milk of Comparative Example 1.

What is claimed is:

1. A method for preparing a whole soybean milk, comprising the steps of:
    A) roasting and peeling soybeans to obtain peeled soybeans, wherein the roasting of soybeans is carried out in a flame fashion using a drum roaster under conditions in which the inside temperature of the drum roaster is from 150 to 240° C., the rotational speed of the drum roaster is from 20 to 40 rpm, the roasting time is from 4 to 12 minutes, and the input and output amounts of the soybeans are from 40 to 50 kg per minute;
    B) cooking the peeled soybeans by using hot water at a temperature of 91 to 99° C. for 3 to 10 minutes to obtain steamed soybeans;
    C) coarsely grinding the steamed soybeans by using a crusher in which the size of a passage net is 1 to 4 Φ and adding 2.4 to 10-fold by weight of water based on the weight of the steamed soybeans to obtain a coarsely ground soybean liquid;
    D) finely grinding particles of the coarsely ground soybean liquid in a cutting manner by using a mechanical grinding device to obtain a whole soybean liquid, wherein the mechanical grinding device is Comitrol, and wherein the finely grinding step comprises first and second micronization steps, wherein the first micronization step uses Comitrol having 212 blades in which the distance between blades is 0.005 inch and the difference in depth between cutting surfaces of a blade and another blade immediately next thereto is 0.0013 inch, and wherein the second micronization step uses Comitrol having 222 blades in which the distance between blades is 0.001 inch and the difference in depth between cutting surfaces of a blade and another blade immediately next thereto is 0.0012 inch, and a mean particle diameter of soybean particles obtained from the first and second micronization steps ranges from 80 to 100 μm, and from 60 to 70 μm, respectively; and
    E) micro homogenizing the whole soybean liquid, wherein the micro homogenization step comprises first and second micro homogenizing steps at a homogeneous pressure of 200 to 300 bar and 150 to 300 bar, respectively, and a mean particle diameter of the whole soybean liquid obtained from the first and second micro homogenization steps ranges from 45 to 55 μm, and from 25 to 35 μm, respectively, and
    wherein the viscosity of the whole soybean milk ranges from 34 to 55 cP.

2. The method of claim 1, wherein the solid content of the coarsely ground soybean B liquid of the step C) ranges from 5 to 15%.

3. The method of claim 1, wherein the step E) comprises the steps of:
    first micro homogenizing the whole soybean liquid obtained from the step D) at a pressure of 200 to 300 bar;

pasteurizing, cooling and sterilizing the obtained whole soybean liquid; and second micro homogenizing the sterilized whole soybean liquid at a pressure of 150 to 300 bar.

4. A method for preparing a whole soybean milk product, comprising the steps of mixing a whole soybean milk prepared by the method of claim 1 with sitologically acceptable foods or additives, then stabilizing the mixture for storage stability, and filling, sterilizing, and cooling the resulting mixture.

* * * * *